US012220382B2

(12) United States Patent
Creek et al.

(10) Patent No.: US 12,220,382 B2
(45) Date of Patent: Feb. 11, 2025

(54) INSULIN BOTTLE INSULATOR AND PROTECTION DEVICE

(71) Applicants: Grace Creek, Fort Washington, MD (US); Shantia Creek-Barrett, Fort Washington, MD (US)

(72) Inventors: Grace Creek, Fort Washington, MD (US); Shantia Creek-Barrett, Fort Washington, MD (US)

( * ) Notice: Subject to any disclaimer, the term of this patent is extended or adjusted under 35 U.S.C. 154(b) by 22 days.

(21) Appl. No.: 18/185,873

(22) Filed: Mar. 17, 2023

(65) Prior Publication Data

US 2024/0139069 A1 May 2, 2024

Related U.S. Application Data

(60) Provisional application No. 63/421,761, filed on Nov. 2, 2022.

(51) Int. Cl.
*A61J 1/16* (2023.01)
*A61J 1/14* (2023.01)

(52) U.S. Cl.
CPC ............. *A61J 1/165* (2013.01); *A61J 1/1412* (2013.01); *A61J 1/1468* (2015.05); *A61J 2200/44* (2013.01); *A61J 2200/50* (2013.01); *A61J 2205/30* (2013.01)

(58) Field of Classification Search
CPC ........ A61J 1/1412; A61J 1/1468; A61J 1/165; A61J 1/18; A61J 2200/44; A61J 2200/50; A61J 2205/30; F25D 3/08
USPC ............... 62/457.1–457.9; 206/438; 215/384
See application file for complete search history.

(56) References Cited

U.S. PATENT DOCUMENTS

| | | | | |
|---|---|---|---|---|
| 3,148,515 | A | 9/1964 | Jentis | |
| 3,713,302 | A | 1/1973 | Reviel | |
| 4,343,158 | A * | 8/1982 | Campbell | F25D 3/08 383/110 |
| 4,738,364 | A * | 4/1988 | Yeager | A61J 1/165 62/457.2 |
| 5,148,930 | A * | 9/1992 | Ota | B65D 23/102 215/384 |
| 5,695,090 | A | 12/1997 | Burdick | |
| 5,934,099 | A * | 8/1999 | Cook | A61J 1/165 62/457.2 |
| 7,900,757 | B2 * | 3/2011 | Sisitsky | A45C 11/20 383/38 |
| 8,479,919 | B2 * | 7/2013 | Kaplan | G09F 3/10 206/438 |
| 10,588,820 | B2 * | 3/2020 | Wengreen | A61M 5/002 |
| 10,989,466 | B2 * | 4/2021 | Alexander | F25D 11/003 |
| 2008/0179339 | A1 | 7/2008 | Lafaver | |
| 2009/0065470 | A1 | 3/2009 | Giralo | |
| 2010/0282762 | A1 | 11/2010 | Leonard | |

* cited by examiner

*Primary Examiner* — Bryon P Gehman
(74) *Attorney, Agent, or Firm* — Brennan, Manna & Diamond, LLC

(57) ABSTRACT

The present invention relates to an insulin bottle insulator and protection device. The device is comprised of a body, an interior space, and a cooling element. The device is further comprised of a lid that keeps the cold air in the device. The interior space is further comprised of an interior protection sleeve that protects the insulin bottle from breaks and cracks if dropped. The device further allows the user to be able to transport their insulin bottles without the risk of being broken or becoming unusable because they become too warm.

14 Claims, 4 Drawing Sheets

INSULIN BOTTLE INSULATOR AND PROTECTION DEVICE

CROSS-REFERENCE TO RELATED APPLICATION

The present application claims priority to, and the benefit of, U.S. Provisional Application No. 63/421,761, which was filed on Nov. 2, 2022, and is incorporated herein by reference in its entirety.

FIELD OF THE INVENTION

The present invention relates generally to the field of insulin protection. More specifically, the present invention relates to an insulin bottle insulator and protection device. The device is comprised of a body, an interior space, and a cooling element. The device is also comprised of a lid that keeps the cold air in the device. The interior space is further comprised of an interior protection sleeve that protects the insulin bottle from breaks and cracks from being dropped. The device further allows the user to be able to transport their insulin bottles without the risk of being broken or becoming unusable because they become too warm. Accordingly, the present disclosure makes specific reference thereto. Nonetheless, it is to be appreciated that aspects of the present invention are also equally applicable to other like applications, devices, and methods of manufacture.

BACKGROUND

Diabetic individuals must keep their insulin cold and safe until it is to be used. However, diabetic individuals may have a difficult time keeping their insulin bottles cold. Most diabetics use certain cooling devices to try and keep their insulin protected and cold. This includes, but is not limited to, ice packs, small coolers, and refrigerators. However, these devices can be bulky and difficult to transport if the user does not have the space or ability to carry these devices. As a result, the inability to transport insulin bottles at the proper temperature may force a user to return to their home to take their insulin to avoid missing out on what could be lifesaving medication. This can lead to a user not being able to truly live their life because they are constantly having to go home to take their insulin.

Furthermore, insulin bottles are usually made of glass and can be broken very easily. Breaking an insulin bottle could be life-threatening for a diabetic user who does not have the ability to get more insulin quickly. Furthermore, replacing insulin can be very expensive and can lead the user to financial difficulties.

Therefore, there exists a long-felt need in the art for an improved insulin bottle insulator and protection device. There also exists a long-felt need in the art for an insulin bottle insulator and protection device that allows a user to transport their insulin without the risk of damaging the bottle. Further, there exists a long-felt need in the art for an insulin bottle insulator and protection device that allows for a hand-held cooler that keeps the insulin bottle cold while the user is away from a refrigerator. In addition, there exists a long-felt need in the art for a small aesthetically pleasing insulin bottle insulator and protection device.

The subject matter disclosed and claimed herein, in one embodiment thereof, comprises an insulin bottle insulator and protection device. The device is comprised of a body, an interior space, and a cooling element. The body is comprised of a lid, and at least one fastener. The lid is closed over top of the insulin bottle to insulate the bottle. The cooling element may be comprised of an insulator to further keep the device cold. The interior space is also comprised of an interior protection sleeve that prevents the insulin bottle from becoming broken or damaged while the device is being transported or used. In this manner, the user can transport their insulin without the risk of it breaking or becoming ruined from warm weather.

In this manner, the insulin bottle insulator and protection device of the present invention accomplishes all of the foregoing objectives and provides an improved means for keeping insulin bottles safe and cold. Further, the device is able to simultaneously keep insulin bottles cold as well as safe from potential breaks or cracks. Also, the device allows the user to have chilled insulin on the go without having to carry around large coolers or return home to take their insulin.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises an insulin bottle insulator and protection device. The insulin bottle insulator and protection device is primarily comprised of a body, a lid, at least one fastener, an interior space, interior protection sleeve, and a cooling element.

In differing embodiments, the body may have the appearance of a multitude of shapes but in the preferred embodiment it is in the shape of an insulin bottle. This allows the bottle to fit securely into the device keeping it cold and preventing it from being damaged while being transported. The body may also be made of a plurality of materials commonly used for coolers. In the preferred embodiment, the interior of the body is manufactured from a neoprene material to insulate the device. In the preferred embodiment, the exterior material is manufactured from a rubber material. The rubber material prevents the device from being broken if it is dropped.

The body may also be comprised of a lid. The lid is movable and is closed over the insulin bottle to keep the cold in and keep the warm air out. This allows the device to stay colder for longer. In the preferred embodiment, the lid is fixedly attached to the body and is manufactured from an insulated flexible rubber material. The lid is further comprised of a fastener located on the interior of the lid with the reciprocating fastener located on the body of the device.

The device is also comprised of an interior space and an interior protection sleeve. The interior protection sleeve is preferably manufactured from a stainless-steel material that fits snug with standard insulin bottles. The interior protection sleeve protects the insulin bottles from hard drops, thus preventing breaks and/or cracks. In differing embodiments, the interior protection sleeve may be made from any durable metal material known in the art.

The device is comprised of a cooling element. The cooling element is further comprised of an insulator. In the preferred embodiment, the cooling element is removably attached from the interior space to allow the user to freeze the cooling element. The cooling element may be any cooling element known in the art. In the preferred embodiment, the insulator is fixedly attached to the cooling element and may be manufactured from any insulating material. The insulator further keeps the cooling element colder for longer and helps to keep the insulin cold.

Accordingly, the insulin bottle insulator and protection device of the present invention is particularly advantageous as it provides the user with an improved insulin cooler. The device is convenient to carry and prevents the device from becoming damaged. Further, the device keeps the insulin bottles cold and allows the user to have their insulin while they are away from home. In this manner, the insulin bottle insulator and protection device overcomes the limitations of existing insulin bottle protectors and coolers known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
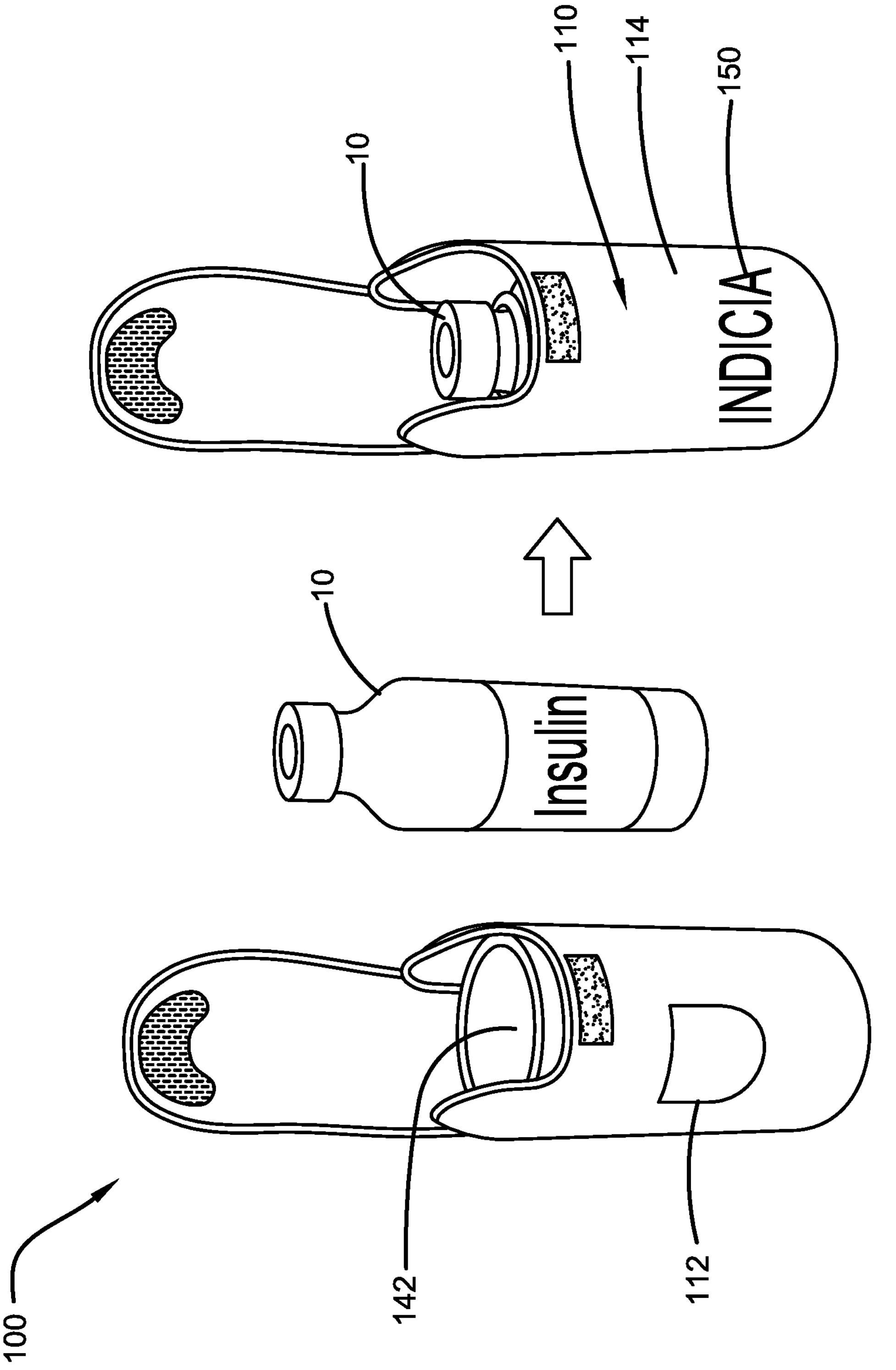
FIG. 1 illustrates a perspective view of one potential embodiment of an insulin bottle insulator and protection device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there exists a long-felt need in the art for an improved insulin bottle insulator and protection device. There also exists a long-felt need in the art for an insulin bottle insulator and protection device that allows a user to have a convenient way to transport their insulin without the risk of damaging the bottle. Further, there exists a long-felt need in the art for an insulin bottle protection and cooler device that allows for a hand-held cooler that keeps the insulin bottle cold while the user is away from a refrigerator. In addition, there exists a long-felt need in the art for a small aesthetically pleasing insulin bottle insulator and protection device.

The present invention, in one exemplary embodiment, is comprised of an insulin bottle insulator and protection device. The device is primarily comprised of a body, a lid, at least one fastener, an interior space, interior protection sleeve, and a cooling element.

In differing embodiments, the body may have the appearance of a multitude of shapes but in the preferred embodiment, it is in the shape of an insulin bottle. This allows the bottle to fit securely into the device keeping it cold and preventing it from being damaged while being transported. The body may also be made of a plurality of materials commonly used for coolers.

In the preferred embodiment, the interior of the body is manufactured from a neoprene material to insulate device. In the preferred embodiment, the exterior material is manufactured from a rubber material. The rubber material prevents the device from being broken if it is dropped. In the preferred embodiment, the lid may be comprised of a plurality of indicia such as patterns, logos, emblems, images, symbols, designs, letters, words, characters, animals, advertisements, brands, etc., that may or may not be insulin related.

The device may also be comprised of a pouch positioned on the outside of the body. This pouch allows a user to be able to secure their needles or other means of applying their insulin in order to prevent the user from losing their items.

The device is further comprised of a cooling element. The cooling element is further comprised of an insulator. In the preferred embodiment, the cooling element is removably attached from the interior space to allow the user to freeze the cooling element. The cooling element may be any cooling element known in the art. In the preferred embodiment, the insulator is fixedly attached to the cooling element and may be manufactured from any insulating material. The insulator further keeps the cooling element colder for longer and helps to keep the insulin cold.

The body may also be comprised of a lid. The lid is movable and is closed over the insulin bottle to keep the cold in and keep the warm air out. This allows the device to stay colder for longer. In the preferred embodiment, the lid is fixedly attached to the body and is manufactured from an insulated flexible rubber material.

The lid is further comprised of a fastener located on the interior of the lid with the reciprocating fastener located on the body of the device. In the preferred embodiment, the lid may be comprised of a plurality of indicia such as patterns, logos, emblems, images, symbols, designs, letters, words, characters, animals, advertisements, brands, etc., that may or may not be insulin related.

The device is further comprised of an interior space and an interior protection sleeve. The interior protection sleeve is preferably manufactured from a stainless-steel material that fits snug with standard insulin bottles. The interior protection sleeve protects the insulin bottles from hard drops, thus preventing breaks and/or cracks. In differing embodiments, the interior protection sleeve may be made from any durable metal material known in the art.

Referring initially to the drawings, FIG. 1 illustrates a perspective view of one potential embodiment of an insulin bottle 10 insulator and protection device 100 of the present invention in accordance with the disclosed architecture. The device 100 is primarily comprised of a body 110, a lid 120, and an interior space 130. In differing embodiments, the body 110 may have the appearance of a plurality of differing types of cooling devices such as, but not limited to, square, ovular, triangular, rectangular, etc.

In the preferred embodiment, the body 110 is generally cylindrical in shape and resembles an insulin bottle 10. This allows an insulin bottle 10 to fit securely into the device 100, wherein the device 100 keeps the insulin bottle 10 cold and prevents it from becoming damaged while being transported. Further, the shape of the body 110 allows for the user to be able to handle the device 100 easily, further eliminating the risk of dropping the device 100.

The body 110 may be made of a plurality of materials commonly used for coolers. These materials may be a flexible or semi-flexible plastic material such as, but not limited to, acrylic, polycarbonate, polyethylene, thermoplastic, acrylonitrile butadiene styrene, low density polyethylene, medium density polyethylene, high density polyethylene, polyethylene terephthalate, polyvinyl chloride, polystyrene, polylactic acid, acetal, nylon, fiberglass, etc. In a different embodiment, the entire body (or only the interior of the body) is manufactured from a neoprene material to insulate an insulin bottle 10 stored within the device 100.

In the preferred embodiment, the exterior material is manufactured from a rubber material such as, but not limited to, neoprene, silicone, nitrile, EPDM, styrene-butadiene, butyl, natural, fluorosilicone, natural rubbers, neoprene rubber elastomer, silicone rubber elastomer, ethylene propylene diene monomer rubber, butyl rubber, nitrile rubber, buna-n rubber, styrene-butadiene rubber elastomers, viton rubber elastomer, diaphragm rubber, thermoplastic rubber, etc. The rubber material prevents an insulation bottle within the device from being broken if the device 100 is dropped.

The exterior of the body 110 may be comprised of a non-slip grip area 114 that prevents the user from dropping the device 100. In one embodiment, the grip area 114 is textured to allow for a better grip of the device 100. In another embodiment, the grip area 114 is shaped to fit a user's hand. The grip area 114 may be manufactured from any non-slip material known in the art.

In addition, the body 110 may be semi-transparent or opaque in differing embodiments. In the preferred embodiment, the body 110 may be comprised of a plurality of indicia 150 such as patterns, logos, emblems, images, symbols, designs, letters, words, characters, animals, advertisements, brands, etc., that may or may not be insulin related.

The body 110 may be comprised of at least one pouch 112 positioned on the exterior of the body 110. The pouch 112 may be used to store the user's insulin needles or other insulin related items. In one embodiment, the pouch 112 may be manufactured from any fabric material such as, but not limited to, vinyl, canvas, cashmere, chenille, chiffon, cotton, damask, jersey, lace, linen, wool, modal, polyester, satin, silk, spandex, suede, tweed, twill, velvet, acrylic, modacrylic, nylon, polypropylene, polyurethane, polyvinyl chloride, polyethylene, vinylidene, benzoate, aramid, rayon, acetate, triacetate, etc. In another embodiment, the pouch 112 may be manufactured from a netting material such as, but not limited to, nylon, cotton, wool, tweed twill, polypropylene polyurethane, polyvinyl, polyethylene, silk, tulle, etc.

The device 110 is also comprised of at least one cooling element 140. In the preferred embodiment, the cooling element 140 can be removably placed into the interior space 130 of the body 110 to allow the user to freeze the cooling element 140 when not in use. The cooling element 140 may be any cooling element known in the art such as, but not limited to, a water-based ice pack, a gel-based ice back, a silica-based ice pack, ice cubes, a refillable water bag, etc.

In the preferred embodiment, the device 100 is comprised of at least one insulator 142 fixedly attached to the interior protection sleeve 132 and may be manufactured from any insulating material such as, but not limited to, fiberglass, mineral wool, cellulose, natural fibers, polystyrene, polyisocyanurate, polyurethane, perlite, cementitious foam, phenolic foam, insulation facings, etc. The insulator keeps the cooling element 140 colder for longer and helps to keep the insulin cold.

Figure 2:
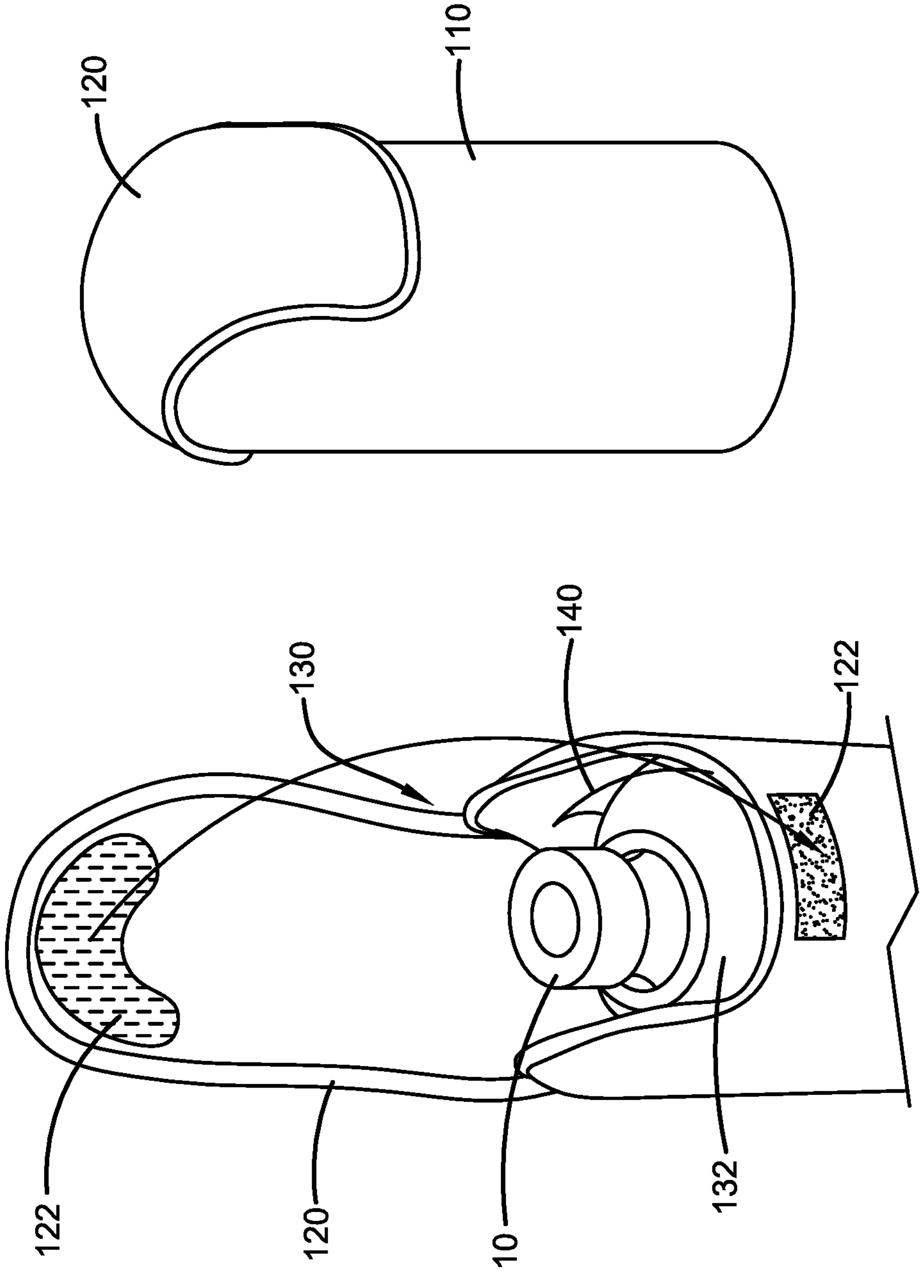
FIG. 2 illustrates a perspective view of one potential embodiment of an insulin bottle insulator and protection device of the present invention while storing an insulin bottle in accordance with the disclosed architecture.
Figure 3:
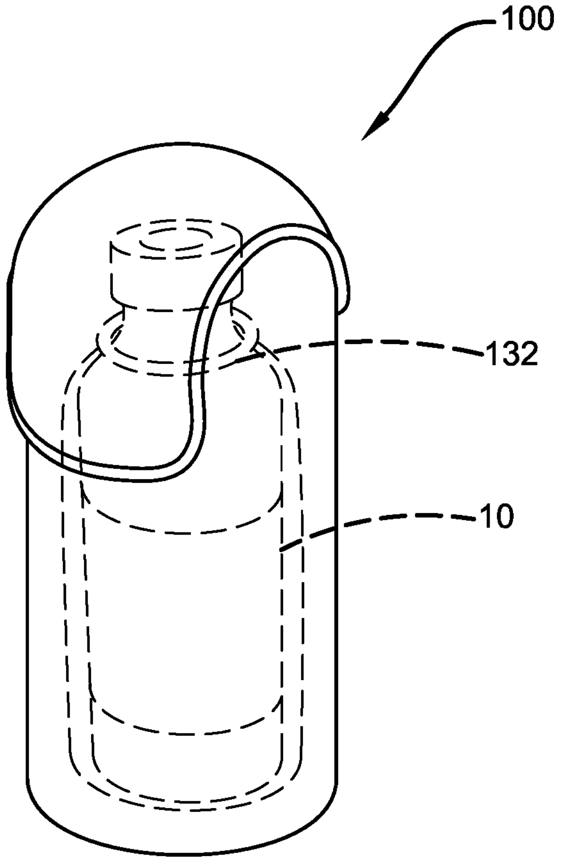
FIG. 3 illustrates an enhanced perspective view of one potential embodiment of an insulin bottle insulator and protection device of the present invention while storing an insulin bottle in accordance with the disclosed architecture.

FIG. 2 illustrates a perspective view of one potential embodiment of an insulin bottle 10 insulator and protection device 100 of the present invention in accordance with the disclosed architecture. The body 110 may also be comprised of a lid 120. The lid 120 is movable and can be closed over an insulin bottle 10 stored within the interior space 130 to insulate the bottle and keep it at a cool temperature, as seen in FIG. 3.

In one embodiment, the lid 120 is fixedly attached to the body 110. In another embodiment, the lid may be removably attached to the body 110. In the preferred embodiment, the lid 120 is fixedly attached to the body 110 and is manufactured from an insulated flexible rubber material. The lid 120 is further comprised of at least one fastener 122 located on the interior of the lid 120 with the reciprocating fastener located on the body 110 of the device 100. There are a plurality of fasteners that may be used such as, but not limited to, hook and loop, tongue and groove, snap button, magnetic, adhesive, etc. In the preferred embodiment, the lid 120 may be comprised of a plurality of indicia 150 such as patterns, logos, emblems, images, symbols, designs, letters, words, characters, animals, advertisements, brands, etc., that may or may not be insulin related.

The interior protection sleeve 132 is preferably manufactured from a rigid material. The interior protection sleeve 132 protects the insulin bottle 10 from hard drops by absorbing the blow and not allowing the device 100 to deform, leading to damage of the insulin bottle 10. In differing embodiments, the interior protection sleeve 132 may be made from any durable rigid or shock-absorbing flexible material known in the art.

Figure 4:
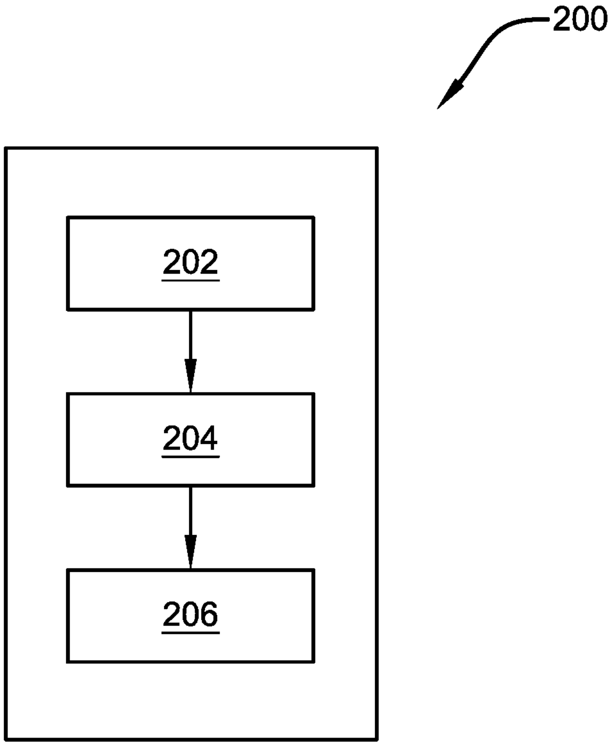
FIG. 4 illustrates a flowchart view of one potential embodiment of an insulin bottle insulator and protection device of the present invention in accordance with the disclosed architecture.

The device 100 is also comprised of a method of use 200, as seen in FIG. 4. First, a device 100 is provided, the device 100 is comprised of a body 110, at least one interior protection sleeve 132, at least one cooling element 140, a lid 120, and at least one insulator 142 [Step 202]. Then, an insulin bottle 10 is placed within the interior protection sleeve 132 [Step 204]. Next, the lid 120 is closed over the bottle 10 and secured to the body 110 via fasteners 122 while the insulator 142 and cooling element keep the insulin bottle 10 at a cool temperature [Step 206].

Certain terms are used throughout the following description and claims to refer to particular features or components. As one skilled in the art will appreciate, different people may refer to the same feature or component by different names. This document does not intend to distinguish between components or features that differ in name but not structure or function. As used herein "insulin bottle insulator and protection device" and "device" are interchangeable and refer to the insulin bottle insulator and protection device 100 of the present invention.

Notwithstanding the foregoing, the insulin bottle insulator and protection device 100 of the present invention and its various components can be of any suitable size and configuration as is known in the art without affecting the overall concept of the invention, provided that they accomplish the above-stated objectives. One of ordinary skill in the art will appreciate that the size, configuration and material of the insulin bottle insulator and protection device 100 as shown in the FIGS. are for illustrative purposes only, and that many other sizes and shapes of the insulin bottle insulator and protection device 100 are well within the scope of the present disclosure. Although the dimensions of the insulin bottle insulator and protection device 100 are important design parameters for user convenience, the insulin bottle insulator and protection device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An insulin bottle insulator and protection device comprising:

a body;

an insulated flexible rubber lid;

means rendering the lid magnetically attachable to the body;

a first fastener;

a second fastener;

an interior protection sleeve positioned within the body; and a silica-based ice pack cooling element.

2. The insulin bottle insulator and protection device of claim 1, wherein the body is comprised of a plastic material.

3. The insulin bottle insulator and protection device of claim 1, wherein the body is comprised of a neoprene material.

4. The insulin bottle insulator and protection device of claim 1, wherein the body is comprised of a rubber material.

5. The insulin bottle insulator and protection device of claim 1, wherein the body further comprises a pouch.

6. The insulin bottle insulator and protection device of claim 1, wherein the interior protection sleeve is comprised of a flexible, shock absorbing material.

7. An insulin bottle insulator and protection device comprising:

a body;

an insulated flexible rubber lid;

a first magnetic fastener positioned on the lid;

a second magnetic fastener positioned on the body;

rigid stainless-steel interior protection sleeve positioned within the body;

a removable refillable cooling element; and an insulator positioned on the rigid stainless-steel interior protection sleeve.

8. The insulin bottle insulator and protection device of claim 7, wherein the insulator is comprised of one of a fiberglass, a mineral wool, a cellulose, a natural fiber, a polystyrene, a polyisocyanurate, a polyurethane, a perlite, a cementitious foam, a phenolic foam, and an insulation facing.

9. The insulin bottle insulator and protection device of claim 7, wherein the body is comprised of a cylindrical shape.

10. The insulin bottle insulator and protection device of claim 7, wherein the body is comprised of a grip area.

11. The insulin bottle insulator and protection device of claim 10, wherein the grip area is comprised of a non-slip material.

12. The insulin bottle insulator and protection device of claim 7, further comprising a pouch is comprised of a netting material.

13. The insulin bottle insulator and protection device of claim 7, wherein the cooling element is removable from the body.

14. The insulin bottle insulator and protection device of claim 7 further comprised of an indicia.

* * * * *